United States Patent
Nielsen

(10) Patent No.: US 12,189,042 B1
(45) Date of Patent: Jan. 7, 2025

(54) UAV WITH GPS SPOOFING DETECTION

(71) Applicant: Simon Nielsen, Beverly Hills, CA (US)

(72) Inventor: Simon Nielsen, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 147 days.

(21) Appl. No.: 17/682,387

(22) Filed: Feb. 28, 2022

Related U.S. Application Data

(60) Provisional application No. 63/168,706, filed on Mar. 31, 2021.

(51) Int. Cl.
*G01S 19/21* (2010.01)
*G01S 19/01* (2010.01)

(52) U.S. Cl.
CPC .......... *G01S 19/215* (2013.01); *G01S 19/015* (2013.01)

(58) Field of Classification Search
CPC .............................. G01S 19/215; G01S 19/015
See application file for complete search history.

(56) References Cited

U.S. PATENT DOCUMENTS

| | | | | |
|---|---|---|---|---|
| 9,466,881 | B1* | 10/2016 | Berry | G01C 21/20 |
| 9,507,026 | B2* | 11/2016 | Nichols | G01S 19/215 |
| 10,466,700 | B1* | 11/2019 | Carmack | G08G 5/0069 |
| 11,163,068 | B2* | 11/2021 | Balog | G01S 19/215 |
| 2010/0286859 | A1* | 11/2010 | Feigh | G08G 5/006 701/25 |
| 2019/0276146 | A1* | 9/2019 | Koivuranta | G06V 10/56 |
| 2019/0323839 | A1* | 10/2019 | Gurdan | B64C 39/024 |
| 2019/0371184 | A1* | 12/2019 | Chen | G08G 5/0069 |
| 2020/0154426 | A1* | 5/2020 | Takács | H04W 72/51 |

* cited by examiner

*Primary Examiner* — Cassi J Galt
(74) *Attorney, Agent, or Firm* — CM Law; Stephen J. Weed

(57) ABSTRACT

A UAV having a GPS spoofing detector allowing the UAV to determine during flight if the GPS is being spoofed by a third party. The UAV includes a 3-axis magnetometer that is utilized by a controller to determine if the GPS data is correct, or if it is incorrect and perhaps being spoofed. The controller compares GPS heading data with heading data provided by the 3-axis magnetometer. The controller generates an alert if heading are not correlated. This allows the controller to respond to the spoofing detection, such as by directing the UAV to return home.

20 Claims, 5 Drawing Sheets

UAV WITH GPS SPOOFING DETECTION

CROSS-REFERENCE TO RELATED APPLICATIONS

This application claims priority to U.S. Provisional Application Ser. No. 63/168,706 filed on Mar. 31, 2021, the contents of which are incorporated fully herein by reference.

TECHNICAL FIELD

The present disclosure generally relates to unmanned aerial vehicles (UAVs).

BACKGROUND

UAVs, including drones, are aircraft without a human pilot aboard. Conventional drones have various configurations (e.g., multiple rotors), a camera and a global positioning system (GPS). Multirotor drones are able to capture images during flight using the camera.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
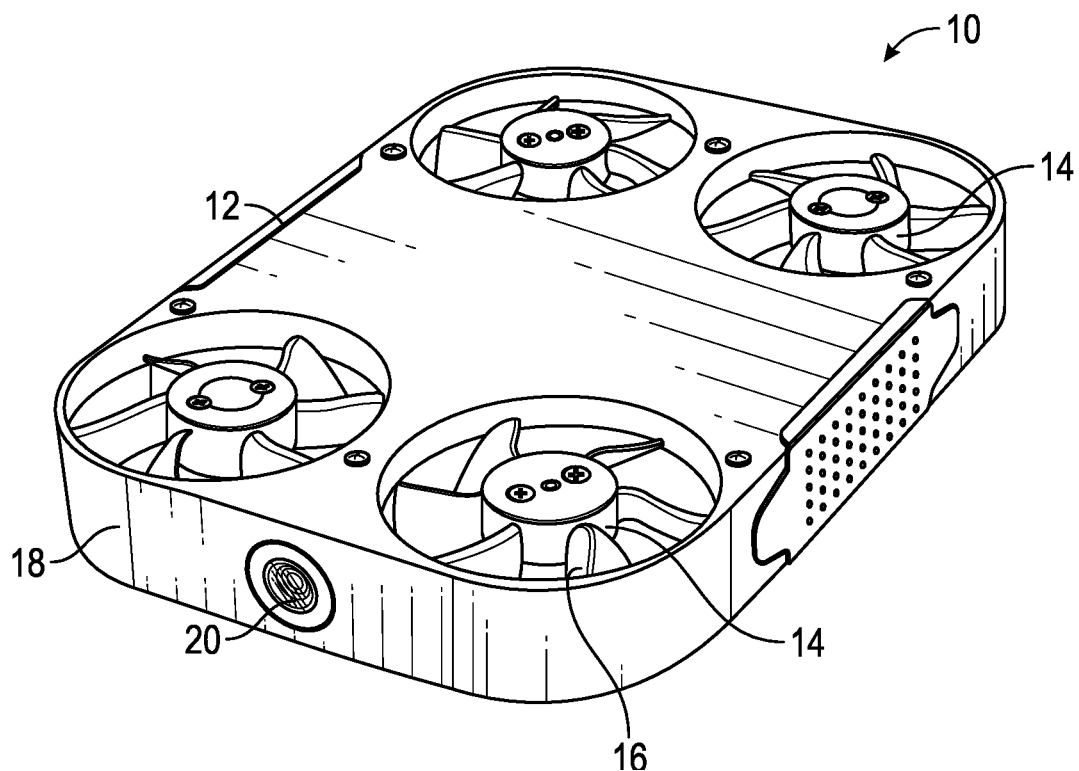
FIG. 1 illustrates a perspective view of a UAV with a fixed camera.

This disclosure provides a UAV having a GPS spoofing detector allowing the UAV to determine during flight if the GPS is being spoofed by a third party. The UAV includes a 3-axis magnetometer that is utilized by a controller to determine if the GPS data is correct, or if it is incorrect and perhaps being spoofed. The controller compares GPS heading data with heading data provided by the 3-axis magnetometer. The controller generates an alert if heading are not correlated. This allows the controller to respond to the spoofing detection, such as by directing the UAV to return home.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Commercial UAVs typically include a camera for imaging the earth and other objects below, for instance, capturing still images and film. In some versions, the camera is fixed to the UAV, without the use of a gimbal for selectively positioning the camera. More complicated UAVs include an electronic receiver and an electronically configurable gimble and camera. A remotely located controller establishes a wireless link with the receiver of the UAV to control the gimble and camera. The electronic receiver, electrically controllable gimbles, and cameras are expensive, fragile, and mechanically complex, and add to the weight and bulkiness of the UAV.

FIG. 1 illustrates a perspective view of a UAV 10 having a body 12 and a plurality of propellers 14 including multiple blades 16. The propeller 14 including blades 16 can be made out of metal or non-conductive material. Typically, non-conductive materials, such as plastic, are used since they are lighter.

Also shown in FIG. 1 is a camera 20 fixed to the body 12 at one side thereof shown at 18 at a fixed pitch angle with respect to the body 12. In this example, the camera 20 is facing horizontal from the body 12 so that the camera pitch angle is zero degrees. In other examples, the camera pitch angle can also be fixed at other pitch angles, such as −5 degrees downward from horizontal, or other pitch angles as desired.

Figure 2:
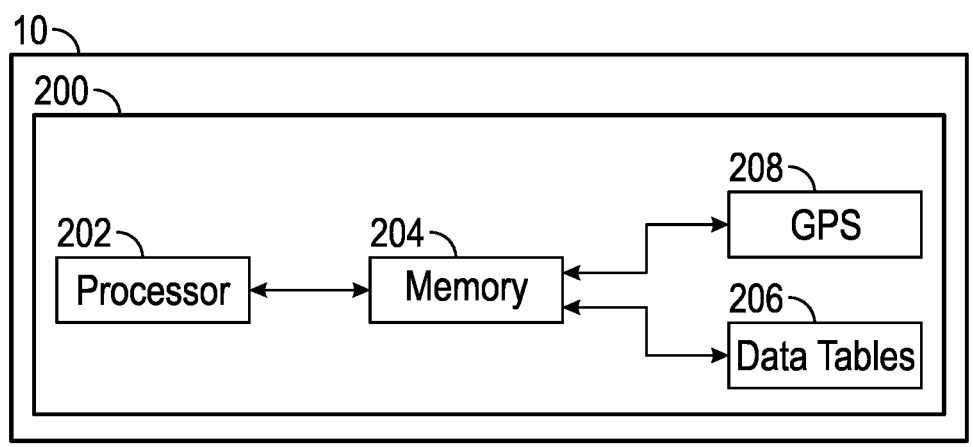
FIG. 2 illustrates control system configured to automatically control the UAV, including UAV operation along a flight path FP and at image capture points.

FIG. 2 illustrates control system 200 configured to automatically control the UAV 10, including UAV operation along a flight path (FP). The control system 200 includes an electronic processor 202 comprising the flight controller, a memory 204 including flight plans, instructions and code for operating processor 202 to control and operate the UAV 10, data tables 206 stored in memory 204, a global positioning system (GPS) receiver 208 for providing global positioning of the UAV 10, and a 3-axis magnetometer (not shown). The electronic processor 202 establishes the FP of the UAV 10 based on performance data in data tables 206 and the GPS 208. Multiple flight paths are stored in memory 204, wherein the flight paths can be custom programmed and downloaded by into memory 204 by a user of the UAV 10 wirelessly or by a cable.

Figure 3:
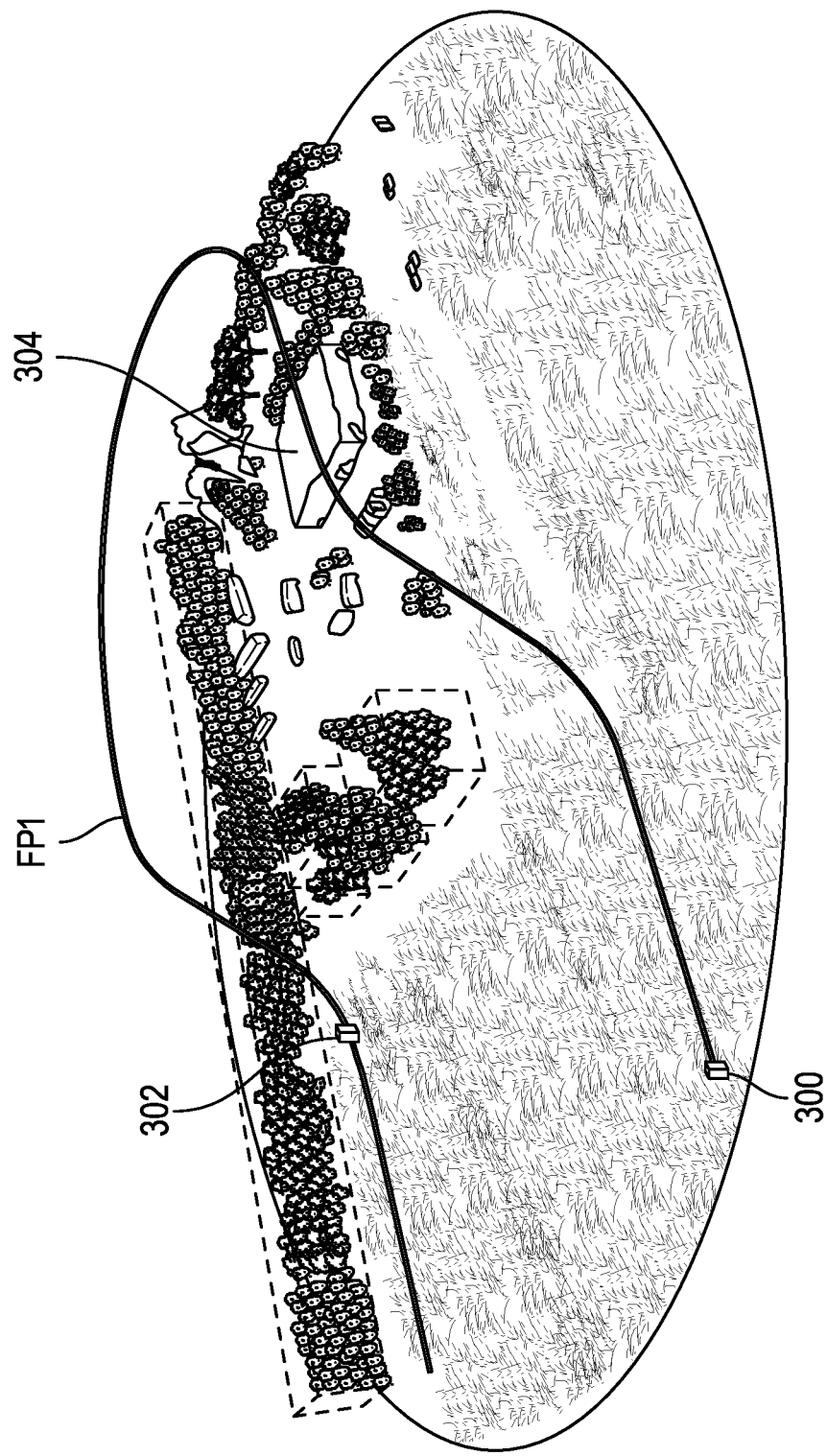
FIG. 3 illustrates a graphical representation of a flight path FP1 that routes the UAV.

FIG. 3 illustrates a graphical representation of a flight path FP1 that routes the UAV 10 from a starting position 300 to an end position 302. The FP1 routes the UAV 10 along a smooth path at varying altitudes to a target(s) 304, also referred to as a point of interest (POI). The target 304 can comprise of many features including buildings, trees, people etc. The limited or restricted spacing around the target 304 constrains and may limit the maneuvering of the UAV 10 about target 304, and thus the camera imaging. This spacing creates difficulty for the UAV 10 having a fixed position camera 20.

Figure 4:
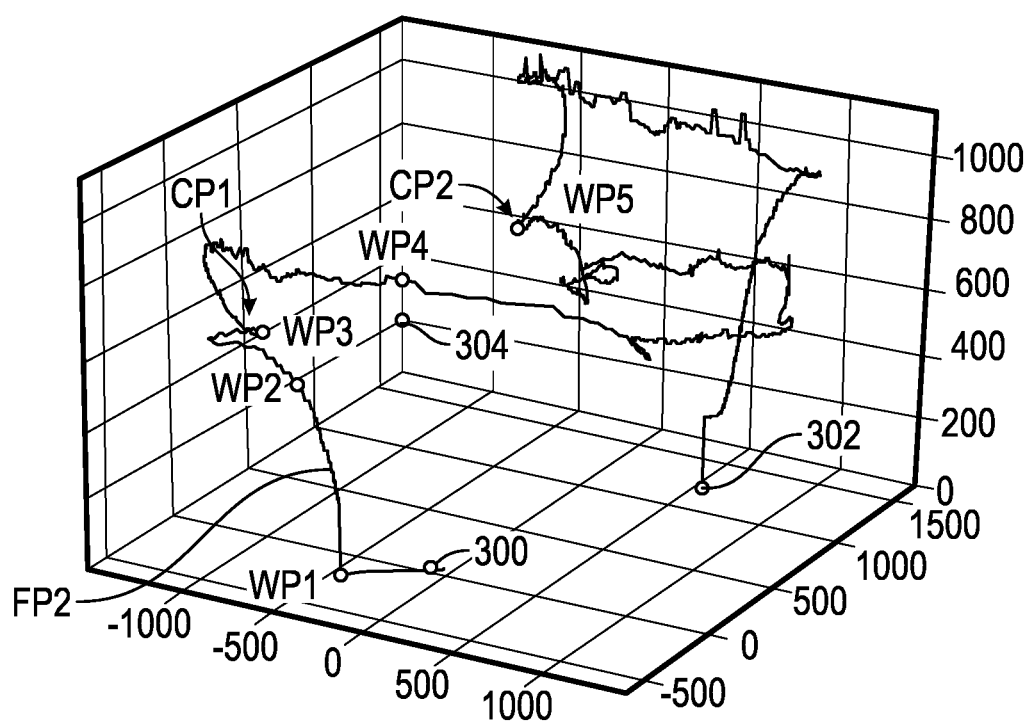
FIG. 4 illustrates a graphical representation of a more complex flight path FP2 that the UAV traverses to and about a target.

FIG. 4 illustrates a graphical representation of a more complex flight path FP2 that the UAV 10 traverses to and about target 304. The flight path FP2 includes multiple waypoints WP and multiple image capture points including image capture points CP1 and CP2. The flight path FP2 also includes performance variables of the UAV 10, and the orientation of the UAV 10 including a pitch angle PA of the camera 20 with respect to horizontal at each waypoint, including proximate the image capture points CP1 and CP2. In this example, the UAV 10 traverses the flight path FP2 having multiple waypoints to image capture point CP1 proximate the target 304.

In an example, the flight path FP2 orients the UAV 10 such that the camera 20 (and the side of body 12) is directed upwardly at a pitch angle PA3 facing target 304 when approaching, and at, image capture point CP1. The camera 20 captures images of target 304 at image capture point CP1 for a predetermine image capture time and stores the images in memory 204. The UAV 10 subsequently traverses flight path FP2 to image capture point CP2 proximate target 304. The flight path FP2 also orients the UAV 10 such that the camera 20 (and the side of body 12) is directed downwardly at a pitch angle PA5 toward target 304. The camera 20 again captures images at image capture point CP2 and stores the images in memory 204.

Since the camera 20 is fixed to body 12 at the fixed pitch angle, orienting the UAV 10 in a predetermined stable position at an angle is not an ordinary task. More importantly, establishing a predetermined camera angle of the camera 20 relative to the target 304 at capture points CP1 and CP2, is not an ordinary task. The flight paths are automatically determined by electronic processor 202 based upon the GPS position of the capture points CP1 and CP2, and the desired camera pitch angle at capture points CP1 and CP2. The processor 202 determines the operational parameters of the UAV 10, and it takes into account the weight and flight performance of the UAV 10. The determined flight paths increase the image capture time at capture points CP1 and CP2, at the desired pitch angle, which is very beneficial for imaging.

GPS spoofing is a problem for a UAV, which is the intentional or unintentional interference with the UAV GPS operation and data. Detecting GPS spoofing is a problem for aerial UAVs including drones in that the UAV 10 heading and actual direction traveled is often not identical due to wind being a significant factor. The UAV 10 relies on GPS data from GPS 208 to compensate for wind, which makes it even more vulnerable to GPS spoofing.

The UAV 10 includes the 3-axis magnetometer so that the processor 202 can measure a change in angle as the UAV 10 drone flies North/South. (In an example, the 3-axis magnetometer does not detect East/West movement). The processor 202 compares the heading data of the 3-axis magnetometer to the heading data from the GPS 208 and determines if this heading information is correlated. An alert to the ground station is generated by the UAV 10 if there is a data mismatch. The ground station can respond, such as by instructing the UAV 10 to return to the ground station. In addition, the UAV 10 may unilaterally decide to return to the home station, such as if it is on an unprogrammed path.

Figure 5A:
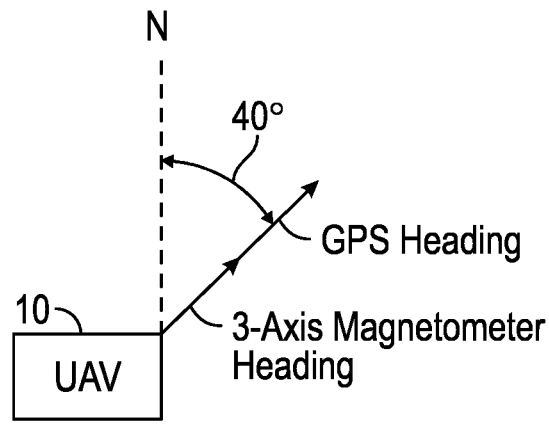
FIG. 5A illustrates the UAV headings of the GPS and the 3-axis magnetometer being aligned and correlated.

Referring to FIG. 5A, there is illustrated the UAV heading as determined by both the GPS 208 and the 3-axis magnetometer. These are the headings the processor 202 of the UAV 10 thinks it is heading, such as 40 degrees east of north. In this example, the processor 202 determines the headings are correlated and they align, and there is no determination of GPS spoofing.

Figure 5B:
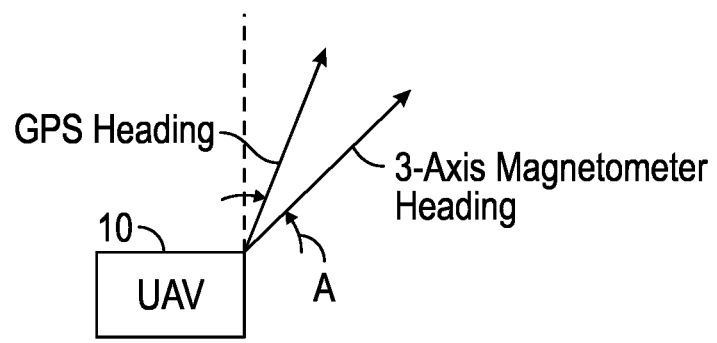
FIG. 5B illustrates the UAV headings of the GPS and the 3-axis magnetometer not being aligned and correlated and indicative of GPS spoofing.

Referring to FIG. 5B, there is illustrated the UAV heading as determined by both the GPS 208 and the 3-axis magnetometer. These are the headings the processor 202 of the UAV 10 thinks it is heading. In this example, the processor 202 determines the headings are not correlated and they don't align as seen by the angle A between the respective headings, and there is determination of GPS spoofing. For example, the GPS 208 may indicate the UAV 10 heading is 20 degrees east of north, and the 3-axis magnetometer may indicate the UAV 10 is heading 40 degrees east of north. In this example, the processor 202 generates an alert that is wirelessly sent to the ground station monitoring and controlling the UAV 10.

Figure 6:
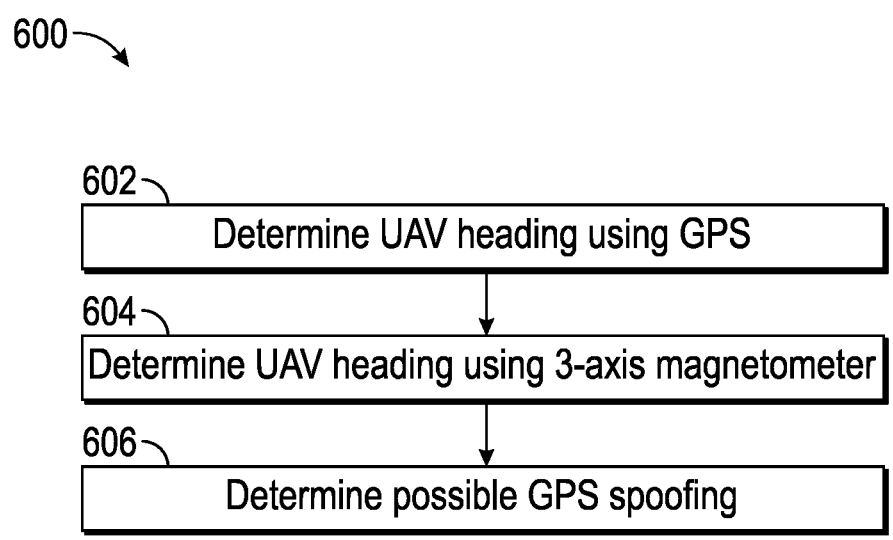
FIG. 6 illustrates a method of operating the UAV to determine GPS spoofing.

Referring to FIG. 6 there is shown a method 600 of the processor 202 operating the UAV 10 according to the determined flight plan FP2 stored in memory 204. The flight plan FP2 establishes the altitude and orientation of the UAV 10 along flight path FP2 to control the UAV 10.

At block 602, the processor 202 determines the heading of the UAV 10 using the GPS 208. For example, the processor 208 may determine the UAV heading is 40 degrees east of north, as shown in FIG. 5A.

At block 604, the processor 202 determines the heading of the UAV 10 using the 3-axis magnetometer. For example, the processor 208 may determine the UAV heading is 40 degrees east of north, as shown in FIG. 5A, or perhaps 20 degrees east of north as shown in FIG. 5B.

At block 606, the processor 202 compares the headings provided by both the GPS 208 and the 3-axis magnetometer to determine if there is a possible GPS spoofing situation. If, for example, as shown in FIG. 5A the headings match, the processor 202 determines there is no GPS spoofing. If, for example, as shown in FIG. 5B, the headings do not match, the processor 202 determines there is GPS spoofing, and generates an alert that is sent to the ground station controlling the UAV 10.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. An unmanned aerial vehicle (UAV), comprising:
a body;
a camera in a fixed position with respect to the body;
at least one propeller coupled to the body;
a global positioning system (GPS) coupled to the body;
a 3-axis magnetometer coupled to the body;
memory containing a flight path having camera capture points; and
a control system configured to control the UAV along the flight path, the control system having a processor configured to determine a first heading of the body using the GPS and a second heading using the 3-axis magnetometer and determine if the headings are correlated or uncorrelated, wherein the control system is configured to determine if the flight path is unprogrammed, wherein the control system is configured to unilaterally decide to return the UAV to a home station when the headings are not correlated and the flight path is an unprogrammed path;
wherein the processor is configured to automatically determine the flight path based upon a GPS position of the camera capture points and a predetermined pitch angle of the camera at the camera capture points.

2. The UAV as specified in claim 1, wherein the control system is configured to automatically determine the UAV is subject to GPS spoofing when the headings are uncorrelated.

3. The UAV as specified in claim 2, wherein the control system is configured to automatically generate an alert when the headings are determined to be uncorrelated.

4. The UAV as specified in claim 1, wherein the flight path includes a plurality of waypoints.

5. The UAV as specified in claim 4, wherein the flight path includes a direction, altitude, and velocity of the UAV as the UAV approaches an image capture point.

6. The UAV as specified in claim 4, wherein the flight path includes a direction, altitude, and velocity of the UAV at each of the waypoints.

7. The UAV as specified in claim 6, wherein the control system includes the memory.

8. A method of operating an unmanned aerial vehicle (UAV), comprising a body, a camera in a fixed position with respect to the body, at least one propeller coupled to the body, a global positioning system (GPS) coupled to the body; a 3-axis magnetometer coupled to the body, memory containing a flight path having camera capture points, and a control system configured to control the UAV along the flight path, comprising:
the control system determining a first heading of the body using the GPS and a second heading using the 3-axis magnetometer;
the control system determining if the headings are correlated or uncorrelated;
the control system determining if the flight path is unprogrammed;
the control system unilaterally deciding to return the UAV to a home station when the headings are not correlated and the flight path is an unprogrammed path; and
automatically determining the flight path based upon a GPS position of the camera capture points and a predetermined pitch angle of the camera at the camera capture points.

9. The method as specified in claim 8, wherein the control system automatically determines the UAV is subject to GPS spoofing when the headings are uncorrelated.

10. The method as specified in claim 9, wherein the control system automatically generates an alert when the headings are determined to be uncorrelated.

11. The method as specified in claim 8, wherein the flight path includes a plurality of waypoints.

12. The method as specified in claim 11 wherein the flight path includes a direction, altitude, and velocity of the UAV as the UAV approaches an image capture point.

13. The method as specified in claim 11, wherein the flight path includes a direction, altitude, and velocity of the UAV at each of the waypoints.

14. The method as specified in claim 13, wherein the control system includes the memory.

15. A non-transitory computer-readable medium storing program code which, when executed, is operative to cause a computing device of an unmanned aerial vehicle (UAV) comprising a body, a camera in a fixed position with respect to the body, at least one propeller coupled to the body, a global positioning system (GPS) coupled to the body, a 3-axis magnetometer coupled to the body, memory containing a flight path having camera capture points, and a control system configured to automatically control the UAV along the flight path, to perform the steps of:
the control system determining a first heading of the body using the GPS and a second heading using the 3-axis magnetometer;
the control system determining if the headings are correlated or uncorrelated;
the control system determining if the flight path is unprogrammed;
the control system unilaterally deciding to return the UAV to a home station when the headings are not correlated and the flight path is an unprogrammed path, and
automatically determining the flight path based upon a GPS position of the camera capture points and a predetermined pitch angle of the camera at the camera capture points.

16. The non-transitory computer-readable medium as specified in claim 15, wherein the program code, when executed, is operative to cause the control system to automatically determine the UAV is subject to GPS spoofing when the headings are uncorrelated.

17. The non-transitory computer-readable medium as specified in claim 16, wherein the program code, when executed, is operative to automatically generate an alert when the headings are determined to be uncorrelated.

18. The non-transitory computer-readable medium as specified in claim 15, wherein the flight path includes a plurality of waypoints.

19. The non-transitory computer-readable medium as specified in claim 18, wherein the flight path includes a direction, altitude, and velocity of the UAV as the UAV approaches an image capture point.

20. The non-transitory computer-readable medium as specified in claim 18, wherein the flight path includes a direction, altitude, and velocity of the UAV at each of the waypoints.

\* \* \* \* \*